(12) United States Patent
Konar

(10) Patent No.: US 6,535,769 B1
(45) Date of Patent: Mar. 18, 2003

(54) MONITORING SYSTEM FOR MONITORING PROCESSING EQUIPMENT

(75) Inventor: Periyathiruvadi Gurunathan Konar, Singapore (SG)

(73) Assignee: Sony Electronics PTE Ltd., Singapore (SG)

(*) Notice: Subject to any disclaimer, the term of this patent is extended or adjusted under 35 U.S.C. 154(b) by 0 days.

(21) Appl. No.: 09/523,357

(22) Filed: Mar. 10, 2000

(30) Foreign Application Priority Data

Mar. 12, 1999 (SG) .............................................. 9900925

(51) Int. Cl.$^7$ ............................................ G05B 11/01
(52) U.S. Cl. ............................ 700/14; 700/21; 700/79; 700/108
(58) Field of Search .............................. 700/12, 14, 79, 700/117, 21, 25, 27, 108; 702/187

(56) References Cited

U.S. PATENT DOCUMENTS

| | | | | |
|---|---|---|---|---|
| 3,753,243 A | * | 8/1973 | Ricketts et al. | 700/19 |
| 3,908,117 A | * | 9/1975 | Naruse et al. | 714/55 |
| 3,939,453 A | * | 2/1976 | Schroeder | 714/46 |
| 4,314,329 A | * | 2/1982 | Crewe et al. | 700/12 |
| 4,535,456 A | * | 8/1985 | Bauer et al. | 714/31 |
| 4,541,063 A | * | 9/1985 | Doljack | 198/810.02 |
| 4,670,834 A | * | 6/1987 | Byal et al. | 700/81 |
| 4,835,699 A | | 5/1989 | Mallard | 700/140 |
| 5,046,013 A | | 9/1991 | Ueda et al. | 700/139 |
| 5,093,772 A | * | 3/1992 | Senda et al. | 700/19 |
| 5,257,171 A | * | 10/1993 | Hara | 700/14 |
| 5,357,422 A | * | 10/1994 | Kuze | 700/14 |
| 5,375,061 A | | 12/1994 | Hara et al. | 700/101 |
| 5,613,115 A | * | 3/1997 | Gihl et al. | 717/123 |
| 5,689,415 A | * | 11/1997 | Calotychos et al. | 700/67 |
| 5,754,451 A | * | 5/1998 | Williams | 702/185 |
| 6,101,419 A | * | 8/2000 | Kennedy et al. | 700/3 |
| 6,185,469 B1 | * | 2/2001 | Lewis et al. | 700/99 |
| 6,219,590 B1 | * | 4/2001 | Bernaden et al. | 700/277 |
| 6,381,509 B1 | * | 4/2002 | Thiel et al. | 700/115 |

FOREIGN PATENT DOCUMENTS

| | | |
|---|---|---|
| EP | 0 712 949 | 5/1996 |
| EP | 0 793 177 | 9/1997 |
| GB | 2 285 700 | 7/1995 |

* cited by examiner

Primary Examiner—John A. Follansbee
Assistant Examiner—Crystal J. Barnes
(74) Attorney, Agent, or Firm—Frommer Lawrence & Haug LLP; William S. Frommer

(57) ABSTRACT

A monitoring system for monitoring processing equipment includes a controller which emits control signals to control the processing equipment. A computer is coupled to the controller. The computer records the control signals emitted by the controller and records status signals received from sensors mounted on the processing equipment. The computer represents the processing equipment as a number of individual cyclical units. Each cyclical unit has an identical sequence of operations during every cycle. The computer also records, for each cycle of every unit, information corresponding to whether the unit has started and completed the cycle.

10 Claims, 3 Drawing Sheets

MONITORING SYSTEM FOR MONITORING PROCESSING EQUIPMENT

FIELD OF THE INVENTION

The invention relates to a monitoring system for monitoring processing equipment and in particular, to permit diagnosis of abnormalities in the processing equipment.

BACKGROUND TO THE INVENTION

Automated production lines are now common for manufacturing a large number of articles where there are a number of repetitive steps which must be carried out on each article during production. Generally, an automated production line has a number of different stations and each station performs a predetermined operation in the manufacture or assembly of the article concerned.

Such automated production lines are now common place in the electronics and automotive industries.

For example, automated production lines are used for the assembly of cathode ray tubes (CRTs) for use in visual display units (VDUs) and televisions. Such a production line takes all the individual components and assembles them to form the finished CRT and then typically subjects the CRT to testing to ensure that the finished CRT operates satisfactorily.

Typically, a CRT production line may assemble a finished CRT from approximately 30 components and the production line may involve in excess of 1000 different steps from the start of the production line to a fully assembled and tested CRT exiting the production line. The total time taken for assembly and testing of a CRT on the production line may be approximately 9 hours.

Therefore, in view of the large number of individual steps which are required during assembly, it can be particularly difficult to determine the location of a fault in the production line rapidly. Rapid location and identification of a fault is desirable in order to minimise the down time in the production line.

SUMMARY OF THE INVENTION

In accordance with a first aspect of the present invention, a monitoring system for monitoring processing equipment comprises a controller which emits control signals to control the processing equipment, and a computer coupled to the controller, the computer recording the control signals emitted by the controller and recording status signals from sensors mounted on the processing equipment, the computer representing the processing equipment as a number of individual cyclable units, each cyclable unit having an identical sequence of operations during every cycle, and the computer also recording, for each cycle of every unit, information corresponding to whether the unit has started and completed the cycle.

Preferably, the controller includes a status signal memory which stores the current status signals from the sensors and the computer records the status signals by recording the contents of the status signal memory at regular intervals.

Preferably, the controller includes a control signal memory which stores the current control signals emitted to the processing equipment, and the computer records the control signals by recording the contents of the control signal memory at regular intervals.

Typically, the recording of the contents of the control signal memory by the computer is synchronised with the first control signal emitted by the controller which starts each unit's cycle.

Preferably, reference data corresponding to a correct cycle of each unit is stored, for example in an electronic database, prior to monitoring the processing equipment. Typically, the data is generated by passing one article through the processing equipment and an operator confirming that each unit has cycled correctly.

Typically, the data stored in the computer comprises the conditions under which each unit starts its operation, and the step in the unit cycle with which the unit starts and finishes.

Preferably, the controller is a programmable controller, such as a programmable logic controller, for example, an Omron Sysmac C1000H programmable controller.

In accordance with a second aspect of the present invention, a method of monitoring processing equipment comprises representing the processing equipment as a number of individual cyclable units, each cyclable unit having an identical sequence of operations during every cycle, and for each cycle of every unit recording whether the unit has started and completed the cycle.

In accordance with a third aspect of the present invention, a method for analysing processing equipment to provide an indication of the location of a fault in the processing equipment, the processing equipment being monitored by a system in accordance with the first aspect, comprises:

(a) determining from the information recorded by the computer which of the units have started but not completed their cycle;

(b) applying the current contents of the status signal memory to the program controlling the programmable controller to derive a set of control signals corresponding to the units which have started but not completed their cycle;

(c) comparing the derived set of control signals with a reference set of control signals to obtain a differential set of control signals, the differential set of control signals being the difference between derived set and the reference set;

(d) comparing the current contents of the status signal memory with a reference set of status signals to obtain a differential set of status signals, the differential set of status signals being the difference between the current contents of the status signal memory and the reference set of status signals; and (e) comparing the differential set of control signals with the differential set of status signals to obtain an indication of the unit or units of the processing equipment in which a fault may exist.

An advantage of the invention is that by dividing the processing equipment into a number of individual cyclable units, it is possible to accurately predict how each unit is supposed to operate correctly during each cycle as each cycle is identical. This facilitates easier detection of an abnormality in the processing equipment by making it easier to identify the unit in which the abnormality is occurring.

Preferably, the number of units that actually start are compared with the number of units which should start when the production line is operating correctly.

The monitoring system is particularly useful for monitoring processing equipment with independent cyclable operations. That is, that the timing of one cycle is not dependent or related to the timing of a cycle of another unit. An example of such processing equipment is a production line, such as a production line for assembling CRTs.

BRIEF DESCRIPTION OF THE DRAWINGS

An example of a monitoring system in accordance with the invention will now be described with reference to the accompanying drawings, in which.

PREFERRED EMBODIMENT OF THE INVENTION

Figure 1:
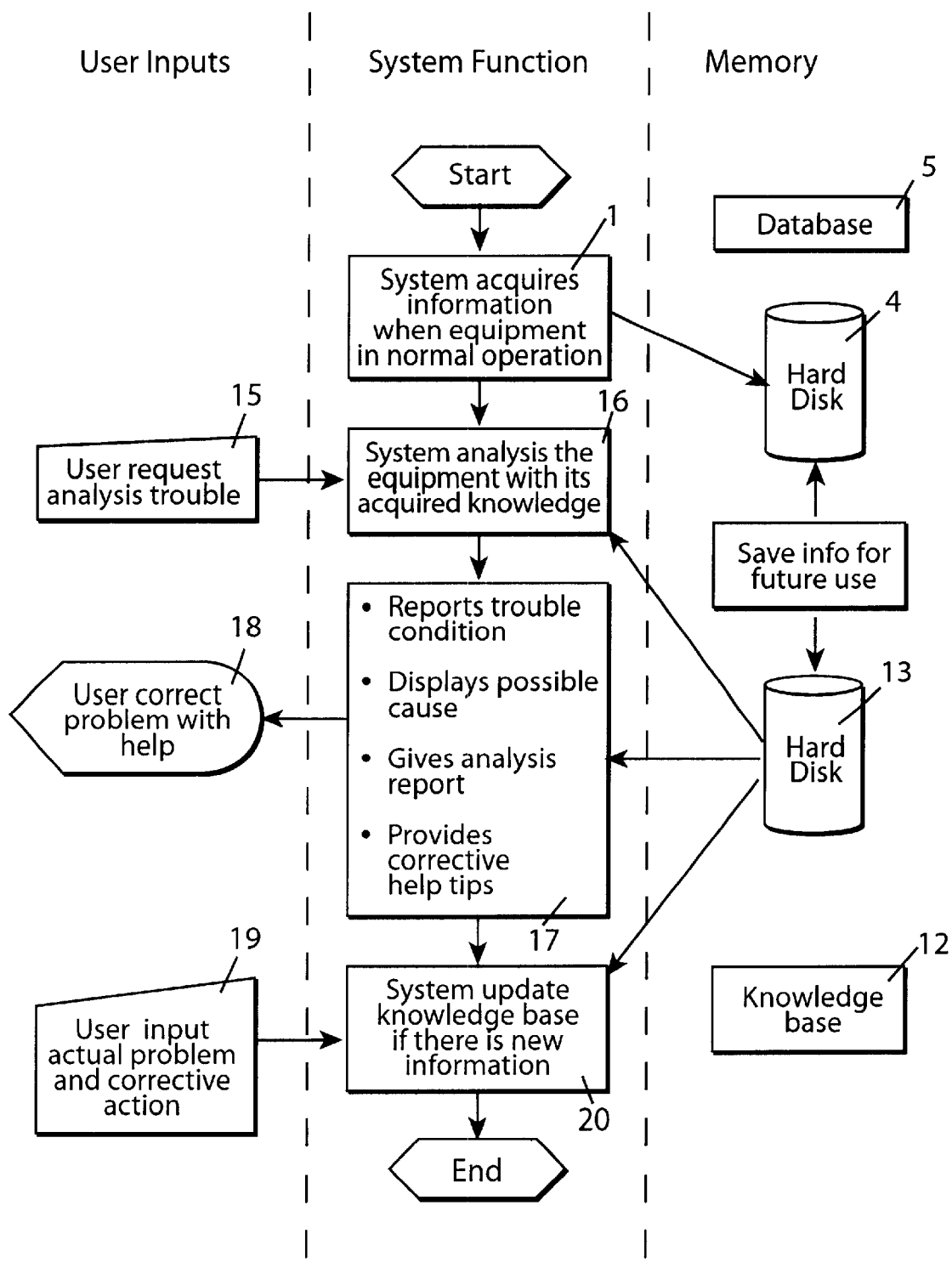
FIG. 1 is a schematic diagram of the monitoring system.

FIG. 1 is a schematic block diagram illustrating a monitoring system for monitoring processing equipment, such as an automated production line, for faults, trouble or any other abnormality which may occur in the processing equipment. As shown in FIG. 1, initialisation of the system involves the system acquiring reference data from the processing equipment when the processing equipment is in normal operation (step 1). The process of acquiring the reference data (step 1) is shown in more detail in FIG. 2.

Figure 2:
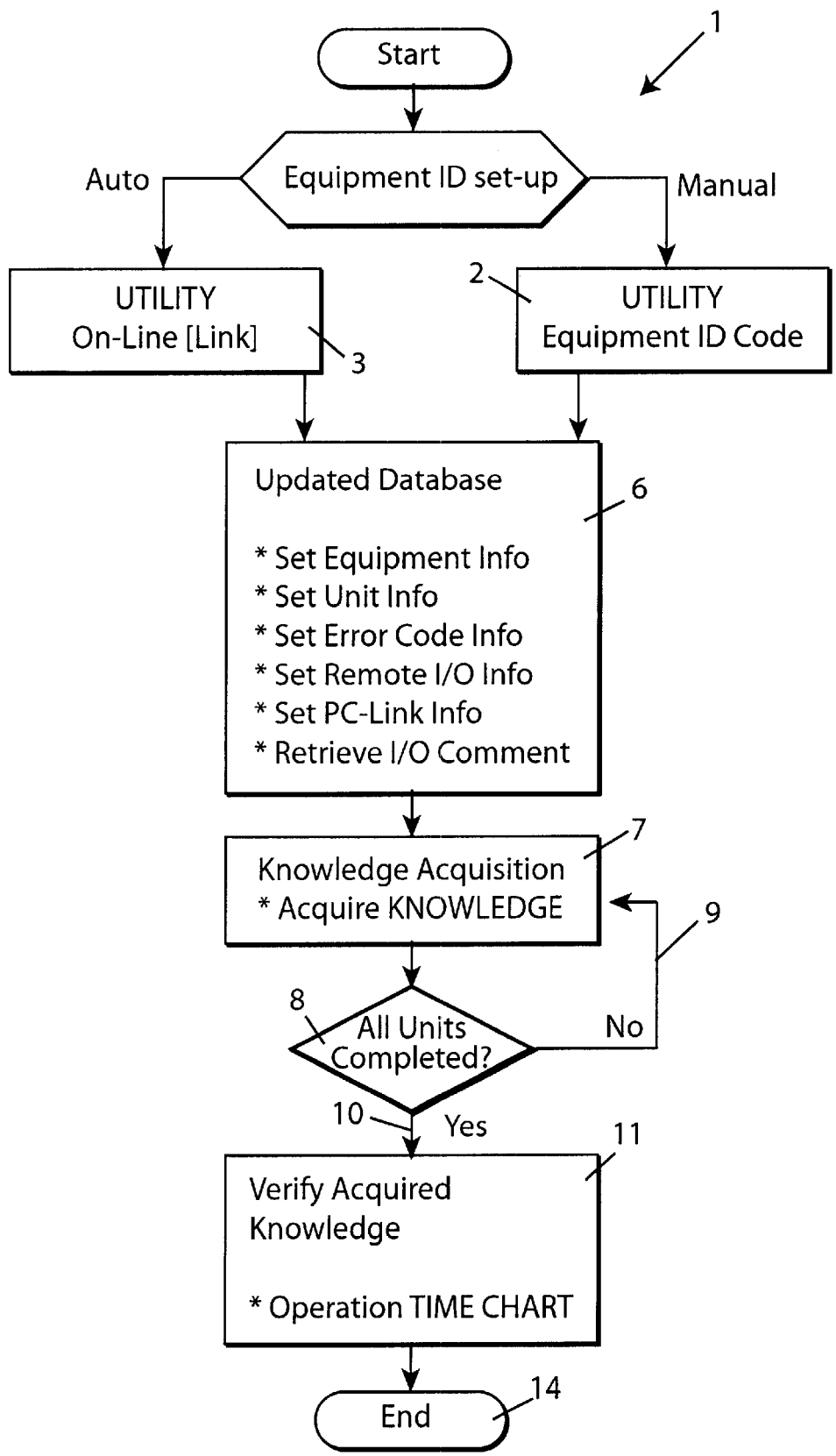
FIG. 2 is a flow diagram showing the initial information setup for the monitoring system.

As shown in FIG. 2, the system acquires the reference information (step 1) by initially reading in the ID code of the process equipment either by an operator entering this information manually (step 2) or automatically (step 3) by an on-line link to the processing equipment. After the processing equipment ID code has been obtained, a database 5 held on a hard disk 4 of a computer is updated (step 6) with information concerning the processing equipment. In particular, the number and details of each individual cyclable unit within the processing equipment, error code information, remote input/output information, PC link information and retrieve input/output information.

The equipment information may include equipment name, plant and process type, number of independent cyclable units, the number of optional units (i.e. units which do not operate for every operation of the processing equipment, for example due to differences in articles processed by the equipment or units which carry out the process on only selected products in the process equipment, such as a reject unit). In addition, the process equipment information also includes details of the model code or model name for which the particular monitoring system is to be used and other information such as trouble/alarm type, auto mode bit, manual mode bit, link mode bit, auto run bit, home position bit, initial computation bit, alarm on bit and trouble on bit.

The unit and error code information includes an identification for each unit in the process equipment, and for each unit an operation start memory bit, an operation end memory bit, an operation start condition bit, an operation end condition bit, a first operation output bit and error codes such as error code number, error code flag, error code type, timer or channel number, internal relay bit number and error code description.

The remote input/output information includes the number of remote input/output units used and the channel address of the first remote input/output unit.

After the database 5 has been updated in step 6, the processing equipment is operated with one product during normal operation conditions and during this operation, the monitoring system acquires the reference information for each unit (step 7). This includes control signals sent by a programmable logic controller (PLC) to the processing equipment to control the processing equipment and information from sensors on the processing equipment indicating the status of individual units on the processing equipment during each cycle. The monitoring system then confirms in step 8 that the acquiring of the reference information for all units (step 7) has been completed. If all the reference information has not been acquired, the monitoring system returns to step 7 (step 9).

If all the reference information has been collected (step 10) the monitoring system prompts an operator to verify (step 11) that the processing equipment has operated normally during the reference information acquisition step 7 by reference to operation time charts. Assuming that the operator confirms that the processing equipment has operated correctly, the reference information is stored by the monitoring system in a knowledge database 12 on a hard disk 13. The acquiring of reference information (step 1) by the system then ends (step 14).

The monitoring system can detect faults or abnormalities in the process equipment automatically by continuously comparing the information received from the PLC and the sensors on the processing equipment with the reference information in the knowledge database 12. Alternatively, a fault or abnormality may be detected by an operator before detection by the monitoring system. In this case the operator can request via an input device (step 15), such as a key board, that the monitoring system analyse the processing equipment to locate and/or determine the fault or abnormality.

The monitoring system can then be used to monitor the processing equipment and the monitoring system compares the actual operation and in particular, the output signals from the PLC and the status signals received from the sensors on the processing equipment for each unit in the processing equipment and compares this with the reference information on the knowledge database 12.

In the context of the application, the term "unit" refers to a cyclable unit of the processing equipment which has an identical sequence of operations during every cycle. As the status information from the sensors and the control signals from the programmable logic controller should be identical for each cycle, the monitoring system can detect a fault or other abnormality in a unit by comparing the actual control signals and status information for a unit with the reference information for that unit stored in the knowledge database 12.

Therefore, proper identification of each unit in the processing equipment is important to ensure that the monitoring system operates correctly. In order to do this, it is necessary to identify all independent repeated sequence operations in the processing equipment. Each independent repeated sequence operation is defined as a "unit" and each unit is given a unique identification code. The number of operations performed by a unit in a cycle may be one or more and theoretically, there is no limit to the number of possible operations in a cycle, as long as the steps of the cycle is repeated every time the unit is operated. Similarly, the number of units for the processing equipment is not limited.

In response to a user request (step 15) or an automatic detection of a fault or abnormality in the processing equipment, the system analyses (step 16) the recent information received from the PLC and the sensors and compares this with the reference information in the knowledge database 12. By carrying out this analysis, the monitoring system can determine which unit or units have not started a cycle, or have started but not finished a cycle.

From this analysis, the monitoring system can identify the unit which is not operating correctly and display possible causes for the fault or abnormality, provide an analysis report and corrective advice to the operator. The operator can then use this information to identify and correct (step 18) the fault or abnormality in the processing equipment.

After the fault or abnormality has been identified and corrected by an operator, the operator inputs details of the actual fault or abnormality identified and the corrective action taken to cure the fault or abnormality (step 19). The system then uses this information to update (step 20) the information held in the knowledge database 12 so that should the same fault or abnormality reoccur, the problem identified and the corrective action taken can be suggested to the operator in step 17.

Figure 3:
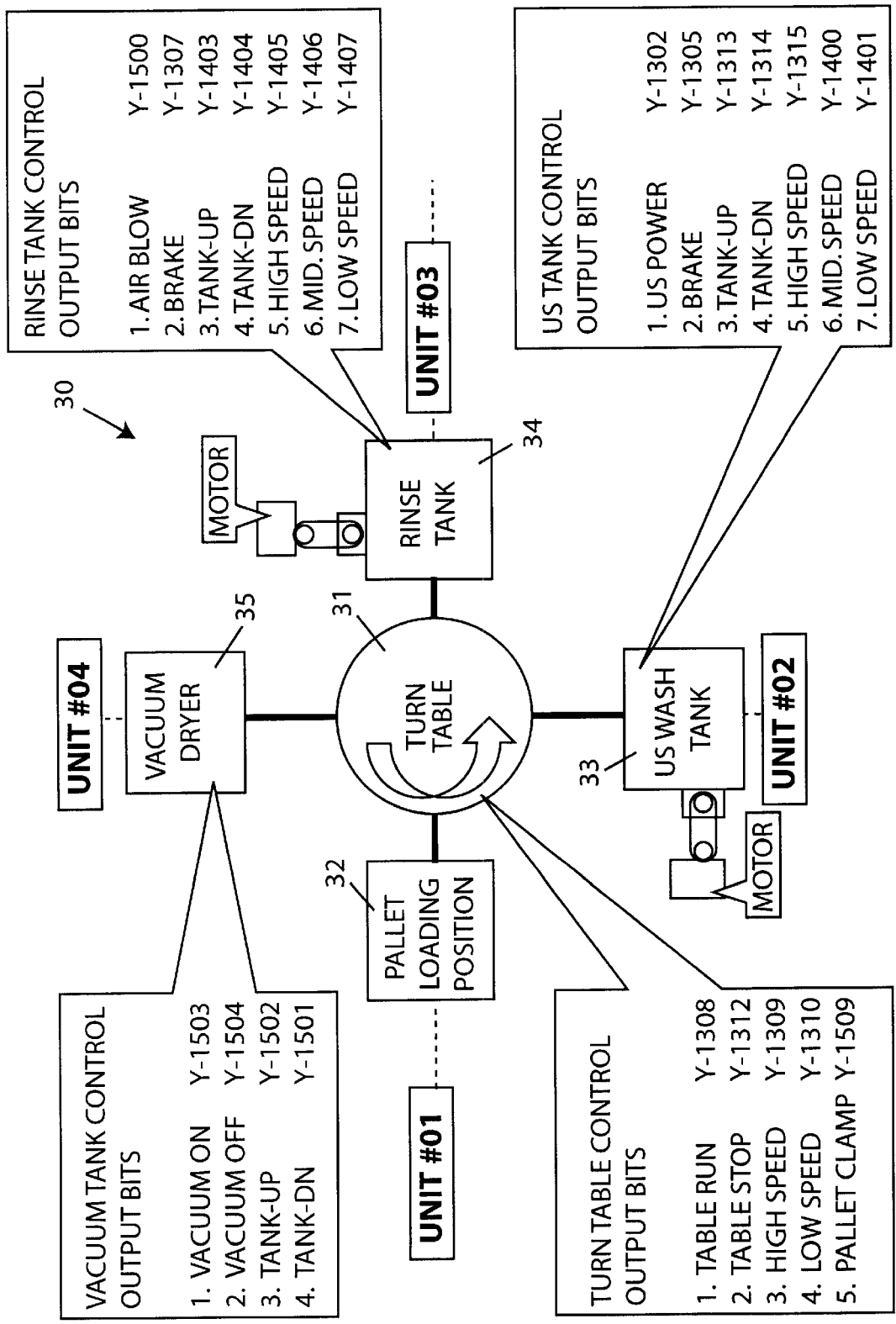
FIG. 3 is a schematic diagram of an ultrasonic CRT gun washer monitored using the monitoring system.

An example of the monitoring system being used to monitor an automatic ultrasonic electron gun washer will now be described with reference to FIG. 3 which is a schematic diagram showing an automatic ultrasonic electron gun washer 30. The gun washer 30 is one piece of processing equipment which is used in the manufacture and assembly of CRTs. The main function of the washer is to wash an electron gun prior to fitting of the electron gun by another piece of processing equipment into a glass tube to form the CRT.

For the purposes of the monitoring system, the washer 30 can be defined as four operations as follows:

1. A turntable 31 which consists of four heads to hold a gun pallet. Individual electron guns are mounted on the gun pallet for washing. The turntable 31 carries the gun pallet between the different operations to be performed by the washer 30. At a loading and unloading station 32 an operator unloads a washed gun pallet and then loads a new gun pallet containing more electron guns for washing;
2. An ultrasonic wash operation 33. This includes an ultrasonic wash tank in which the electron guns are washed. The ultrasonic tank is located below the gun pallet and is moved upwardly towards the gun pallet to a position in which all the electron guns on the pallet are immersed in the water. Ultrasonic waves are then passed through the water in the wash tank to wash the electron guns;
3. A hot water rinse operation 34. This includes a hot water rinse tank in which the electron guns are rinsed after the ultrasonic wash operation 33. The rinse tanks are also located below the gun pallet and are moved up to a position in which all the electron guns on the pallet are immersed in the hot water in the rinse tank to rinse the electron guns; and
4. A vacuum drying operation 35. This includes a vacuum dryer is used to evaporate water from the electron guns to dry the electron guns. The vacuum dryer consists of an electric heater and a pipe connected to a vacuum pump. The vacuum dryer moves up to the gun pallet position and the vacuum is switched on and the vacuum dryer is held in this position for a preset time to dry the guns.

Each of the four operations are repeated in the same sequence of operations during each cycle. Therefore, each of the four operations is independently cyclable and can be defined as one unit for the purposes of the monitoring system. Each of the four units has the following control output bits:

Unit 1—Turntable
1. Table run
2. Table stop
3. High speed
4. Low speed
5. Pallet clamp Unit 2—Ultrasonic Wash
1. Ultrasonic power
2. Brake
3. Tank up
4. Tank down
5. High speed
6. Medium speed
7. Lowspeed Unit 3—Rinse
1. Air blow
2. Brake
3. Tank up
4. Tank down
5. High speed
6. Medium speed
7. Low speed Unit 4—Vacuum Dryer
1. Vacuum on
2. Vacuum off
3. Tank up
4. Tankdown Each of the control output bits are entered during step 6 as unit information along with the unit name and the operation start and end memory bits.

Predefined error codes are generated by the PLC. Each error code has a unique predefined internal relay bit or timer. There are two types of error code conditions. The first error code condition is an "trouble" condition and the second error code condition is an "alarm" condition. If the error code "trouble" condition is generated then the processing equipment will stop operation. However, if the error code "alarm" condition is generated, the equipment continues in normal operation. Therefore, the alarm condition is only a warning. These error code conditions stop all the predefined error code numbers and their flags and error messages are entered into the database 5 during step 6 and provide information for error code troubleshooting. The following information is set for all predefined error codes:

1. Error code identification number;
2. Error code type (IR bit or TIMER);
3. Error code flag (trouble or alarm);
4. Error code IR/timer number (timer number for TIMER type or IR channel number for IR bit type);
5. Error code IR bit numbers for IR bit type (applies to IR bit type only);
6. Error code description; and
7. Troubleshooting help information.

For the washer 30, the machine error code type is TIMER and there are a total of 48 predefined error codes. An example of one error code is:

| | |
|---|---|
| 1. Error code number | 001 |
| 2. Error code type | TIMER |
| 3. Error code flag | Trouble |
| 4. Error code IR channel/timer number | 300 |
| 5. Error code IR bit number (for IR bit type) | 00 |
| 6. Error code description | Emergency Stop - 1 |

7. Troubleshooting help information
   (i) Check emergency switch at control panel.
   ii) If OK check 24 volt power supply voltage;
   iii) Check input bit at input module 01

After the error code information has been entered, the monitoring system proceeds to step 7. The reference information is acquired during normal operation of the processing equipment, in this case the washer 30, and can take from a few minutes to a few hours depending on the number of units within the processing equipment and the operation duration of the processing equipment. After the washer operation sequence reference information has been acquired in step 7, it is verified by an operator in step 8 by comparing it with existing operation time charts.

After the knowledge acquisition has been completed and verified, the monitoring system can be used to monitor for faults or abnormalities in the washer 30 by comparing actual signals output by the PLC to control the washer 30 and the actual status information received from sensors on the units 31, 33, 34, 35 of the washer 30 with the reference information stored in the knowledge database 12 to help identify and correct faults or abnormalities occurring in the washer 30 during operation.

I claim:

1. A monitoring system for monitoring processing equipment comprising:
   a controller which emits control signals to control the processing equipment; and
   a computer coupled to the controller, the computer recording the control signals emitted by the controller, status signals emitted from sensors mounted on the processing equipment and reference information representing a standard sequence of status signals,
   whereby the computer represents the processing equipment as a number of individual cyclical units, each cyclical unit having an identical sequence of operations during every cycle, and
   whereby the computer records, for each cycle of every unit, information corresponding to whether the unit has started and completed the cycle.

2. A system according to claim 1, wherein the controller includes a status signal memory which stores the current status signals from the sensors and the computer records the status signals by recording the contents of the status signal memory at regular intervals.

3. A system according to claim 1, wherein the controller includes a control signal memory which stores the current control signals emitted to the processing equipment, and the computer records the control signals by recording the contents of the control signal memory at regular intervals.

4. A system according to claim 3, wherein the recording of the contents of the control signal memory by the computer is synchronised with the first control signal emitted by the controller which starts each unit's cycle.

5. A system according to claim 1, wherein the controller is a programmable controller.

6. A system according to claim 5, wherein the programmable controller is a programmable logic controller.

7. A monitoring system for monitoring processing equipment comprising:
   a controller which emits control signals to control the processing equipment;
   a computer coupled to the controller, the computer recording the control signals emitted by the controller and recording status signals from sensors mounted on the processing equipment, the computer representing the processing equipment as a number of individual cyclical units, each cyclical unit having an identical sequence of operations during every cycle, and the computer also recording, for each cycle of every unit, information corresponding to whether the unit has started and completed the cycle; and
   a reference database coupled to or forming part of the computer, the reference database containing reference data corresponding to a correct cycle of each unit.

8. A system according to claim 7, wherein the reference data comprises the conditions under which each unit starts its operation, and the step in the unit cycle with which the unit starts and finishes.

9. A method for analysing processing equipment to provide an indication of the location of a fault in the processing equipment, the processing equipment being monitored by a monitoring system comprising a programmable controller which emits control signals to control the processing equipment, and a computer coupled to the controller, the computer recording the, control signals emitted by the controller and recording status signals from sensors mounted on the processing equipment, the computer representing the processing equipment as a number of individual cyclical units, each cyclical unit having an identical sequence of operations during every cycle, and the computer also recording, for each cycle of every unit, information corresponding to whether the unit has started and completed the cycle, the system further comprising a reference database coupled to or forming part of the computer, the reference database containing reference data corresponding to a correct cycle of each unit, the method comprising:
   (a) determining from the information recorded by the computer which of the units have started but not completed their cycle;
   (b) applying the current contents of the status signal memory to a program controlling the programmable controller to derive a set of control signals corresponding to the units which have started but not completed their cycle;
   (c) comparing the derived set of control signals with a reference set of control signals from the reference data stored in the reference database to obtain a differential set of control signals, the differential set of control signals being the difference between derived set and the reference set;
   (d) comparing the current contents of the status signal memory with a reference set of status signals from the reference data stored in the reference database to obtain a differential set of status signals, the differential set of status signals being the difference between the current contents of the status signal memory and the reference set of status signals; and
   (e) comparing the differential set of control signals with the differential set of status signals to obtain an indication of the unit or units of the processing equipment in which a fault may exist.

10. A method of monitoring processing equipment comprising the steps of:
   recording status signals emitted from sensors mounted on the processing equipment; and
   recording reference information representing a standard sequence of status signals;
   whereby the processing equipment is represented as a number of individual cyclical units, each cyclical unit having an identical sequence of operations during every cycle, and for each cycle of every unit, recording whether the unit has started and completed the cycle.

* * * * *